United States Patent
Kayadere et al.

(10) Patent No.: US 10,246,135 B2
(45) Date of Patent: Apr. 2, 2019

(54) FOLDABLE UNDERBODY PANEL

(71) Applicant: Dr. Ing. h.c. F. Porsche Aktiengesellschaft, Stuttgart (DE)

(72) Inventors: Fuat Kayadere, Heilbronn (DE); Steffen Hoelzel, Eberdingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 16 days.

(21) Appl. No.: 15/683,824

(22) Filed: Aug. 23, 2017

(65) Prior Publication Data

US 2018/0057069 A1 Mar. 1, 2018

(30) Foreign Application Priority Data

Aug. 25, 2016 (DE) .................. 10 2016 115 753

(51) Int. Cl.
| | |
|---|---|
| *B60N 99/00* | (2006.01) |
| *B62D 25/20* | (2006.01) |
| *B62D 35/02* | (2006.01) |
| *B21D 53/88* | (2006.01) |
| *B23P 11/00* | (2006.01) |
| *B21D 11/08* | (2006.01) |

(52) U.S. Cl.
CPC ......... *B62D 25/2072* (2013.01); *B21D 53/88* (2013.01); *B62D 25/20* (2013.01); *B62D 35/02* (2013.01); *B21D 11/08* (2013.01); *B23P 11/00* (2013.01)

(58) Field of Classification Search
CPC .... B62D 25/2072; B62D 25/20; B62D 35/02; B21D 53/88; B21D 11/08; B23P 11/00
See application file for complete search history.

(56) References Cited

U.S. PATENT DOCUMENTS

| | | | |
|---|---|---|---|
| 6,254,168 B1 * | 7/2001 | Crotty .................. | B60J 3/0282 296/97.1 |
| 6,926,347 B2 * | 8/2005 | Fior ........................ | B60P 1/00 296/182.1 |
| 7,225,542 B2 * | 6/2007 | Chernoff ............. | B62D 25/105 29/421.1 |
| 7,963,038 B2 * | 6/2011 | Schmitz .................. | B64C 9/02 29/897.2 |
| 8,746,782 B2 | 6/2014 | Naoi | |
| 9,023,463 B2 * | 5/2015 | Lin .................. | B32B 17/10761 428/212 |

(Continued)

FOREIGN PATENT DOCUMENTS

| | | | |
|---|---|---|---|
| DE | 102006002769 A1 * | 8/2007 | |
| GB | 2231891 A * | 11/1990 | |
| WO | WO-2008132368 A3 * | 12/2008 | ............. B32B 17/10 |

*Primary Examiner* — Lori L Lyjak

(74) *Attorney, Agent, or Firm* — Gerald E. Hespos; Michael J. Porco; Matthew T. Hespos

(57) ABSTRACT

An underbody panel for a motor vehicle is composed of a lightweight sandwich material and is configured as a single part with at least one continuous folding connection (12) that is arranged between first and second portions of the underbody panel (14). The first and second portions can be folded together via the folding connection (12) and, in the folded state, are substantially parallel to each other to reduce a size of the underbody panel during transport and storage. Additionally, the underbody panel is gap-free when installed on a motor vehicle.

10 Claims, 5 Drawing Sheets

(56) References Cited

U.S. PATENT DOCUMENTS

| | | | |
|---|---|---|---|
| 2010/0304094 A1* | 12/2010 | Brook | B29C 70/222 |
| | | | 428/174 |
| 2011/0133522 A1* | 6/2011 | Kring | B60R 13/0225 |
| | | | 296/214 |
| 2017/0021870 A1* | 1/2017 | Ito | B21D 19/08 |
| 2017/0259540 A1* | 9/2017 | Wade | B32B 27/308 |
| 2017/0361579 A1* | 12/2017 | Chen | B32B 17/10761 |
| 2017/0363863 A1* | 12/2017 | Chen | G02B 27/0018 |
| 2018/0208132 A1* | 7/2018 | Schaefer | B60R 13/083 |
| 2018/0304591 A1* | 10/2018 | Lu | B32B 17/10761 |

\* cited by examiner

FOLDABLE UNDERBODY PANEL

CROSS REFERENCE TO RELATED APPLICATION

This application claims priority under 35 USC 119 to German Patent Appl. No. 10 2016 115 753.8 filed on Aug. 25, 2016, the entire disclosure of which is incorporated herein by reference.

BACKGROUND

1. Field of the Invention

The invention relates to an underbody panel composed of a lightweight sandwich material for a motor vehicle, and to a method for producing the underbody panel.

2. Description of the Related Art

Aerodynamics of a vehicle can be improved if the underbody is encased completely and without any gaps. This design objective often is achieved by installing large underbody panels. For example, U.S. Pat. No. 8,746,782 describes an underbody covering that is separated via a folding line into front and rear parts, and therefore the front and rear coverings can be opened and closed independently of each other. Large components are provided due to the size of the underbody, and therefore storage and transport of the underbodies requires a large amount of space due the component size and the diversity of variants.

There accordingly is a constant need to provide a lightweight underbody panel composed of a lightweight for a motor vehicle to save on storage space, transport volume and transport costs for the underbody panel.

It is an object of the invention to provide an integral underbody panel that is configured to save on storage space and transport volume and that provides a gap-free underbody when installed on the motor vehicle.

SUMMARY

The invention relates to an underbody panel that is formed integrally from a lightweight sandwich material and configured as a single part. The underbody panel has at least first and second portions that are articulated to one another at a continuous folding connection that extends in the transverse direction of the vehicle. The first and second portions of the underbody panel can be folded together via the folding connection and, in the folded state, are oriented substantially parallel to each other to reduce a size of the underbody panel during transport and storage of the underbody panel.

A unitary underbody panel can have a size of 1380 mm×1000 mm. These dimensions are too large for load carriers for storing the underbody panels. Furthermore, the spaces for the load carriers in the PAG high rack are limited to a maximum of 700 mm×700 mm×1100 mm, and special spaces are frequently not possible next to the manufacturing line. However, the folding connection enables the component size, and therefore the packing size, of the underbody panel to be reduced for transport and storage. Therefore the underbody panel is folded together for transport to the assembly location. The folding connection can be introduced into an underbody panel by a forming tool, for example a punching tool composed of steel or aluminum, to produce a unitary underbody panel that can be folded together about the folding connection. The folding connection also can be produced by pressing the semi-finished product of the underbody panel to a minimum wall thickness. The folding connection also can be adapted in the forming die that defines the shape of the underbody panel.

The underbody panel can be produced from a lightweight sandwich material, low weight reinforced thermoplastics (LWRT), for example SymaLite from Quadrant.

Thus, the invention can provide an integral underbody panel that can save on storage space and transport volume, while still providing a gap-free underbody panel in the installed state on a motor vehicle is made possible.

The folding connection may be substantially in the center of the underbody panel so that the underbody panel can be folded together substantially symmetrically.

The folding connection may comprise at least two bending edges that may be spaced apart from one another in the longitudinal direction of the underbody panel. A cavity may be formed between the facing sides of the first and second portions. The cavity may be used to accommodate holding devices, fastening means, wiring ducts, cable guides, guiding elements and/or other components to avoid deformation, distortion or other damage.

The bending edges may be wedge-shaped and can be folded over by 45°. Additionally, the bending edges can be spaced apart from one another in the longitudinal direction of the underbody panel. The combination of the wedge-shape and the 45° folding-over angle permits a defined height of the folded-over underbody panel so that a certain number of folded-together underbody panels can be stored in one load carrier.

Each bending edge may have a radius transition at the transition from bending edge to the adjacent surface of the underbody panel. The radius transition reduces load peaks and permits an optimized force flux.

At least one soft component may at least partially cover the bending edges. The soft components can be pressed onto the bending edges. In particular, the soft components can be arranged at the borders of the bending edges. Furthermore, the soft component can completely cover the folding connection. The soft component can be produced from a thermoplastic elastomer (TPE). The soft component can be incorporated or embedded in the underbody panel as a film. Furthermore, the soft component can be connected to the underbody panel by an integrally bonded connection, for example by adhesive bonding or welding. The soft component prevents cracking.

The soft component can be applied in a one-shot manufacturing process. For example, all of the components of the underbody connection can be placed together (above the melting point of the thermoplastics) into the forming tool in which both the folding geometry and the welding of the components are produced. The soft component can be placed as a film onto the semi-finished product of the underbody panel and can be pressed onto the corresponding point of the underbody panel in a shaping process of the underbody panel.

The side of the underbody panel that is opposite the soft component may comprise at least one slot running in the transverse direction of the underbody panel. The slots can run partially or completely in the transverse direction of the component length and can completely penetrate the underbody panel. The slots enable the underbody panel to be folded together in a defined manner to reduce the size for transport and for storage.

The at least one slot can be produced by a laser cut. Laser cutting refers to a method that uses a laser for thermally separating a component. For example, laser cutting is used for plate-like material, such as metal sheets, wooden plates or organic materials and for three-dimensional bodies, such as pipes or profiles. This method is useful for products that have complex contours, such as two or three-dimensional contours, and enables a precise, rapid machining, the production of three-dimensional apertures, cutting at poorly accessible locations, and/or a contactless, virtually force-free machining. Unlike alternative methods, such as punching, laser cutting is economical for very small batch sizes. Some machines provide a laser cutter on a nibbling or punching head to achieve the advantages of both manufacturing methods laser cutting with those of nibbling and punching by manufacturers. The laser cutter of such a combined apparatus may be used for cutting arbitrary contours. Use may be made of focused high-performance lasers, CO2 lasers, for example a gas laser, or increasingly also of Nd:YAG lasers and also the more efficient and readily focusable fiber lasers.

The invention further relates to a method for producing a folding connection in an underbody panel that can be formed as above. The method may comprise:

providing an underbody panel, pressing the underbody panel over at the folding connection to a minimum wall thickness.

The method enables an underbody panel that saves on storage space and transport volume. The method also enables a gap-free underbody when installed on a motor vehicle.

The invention is explained with reference to the attached drawings. Each feature illustrated below can be used individually and also in combination to illustrate an aspect of the invention.

DETAILED DESCRIPTION

Figure 1:
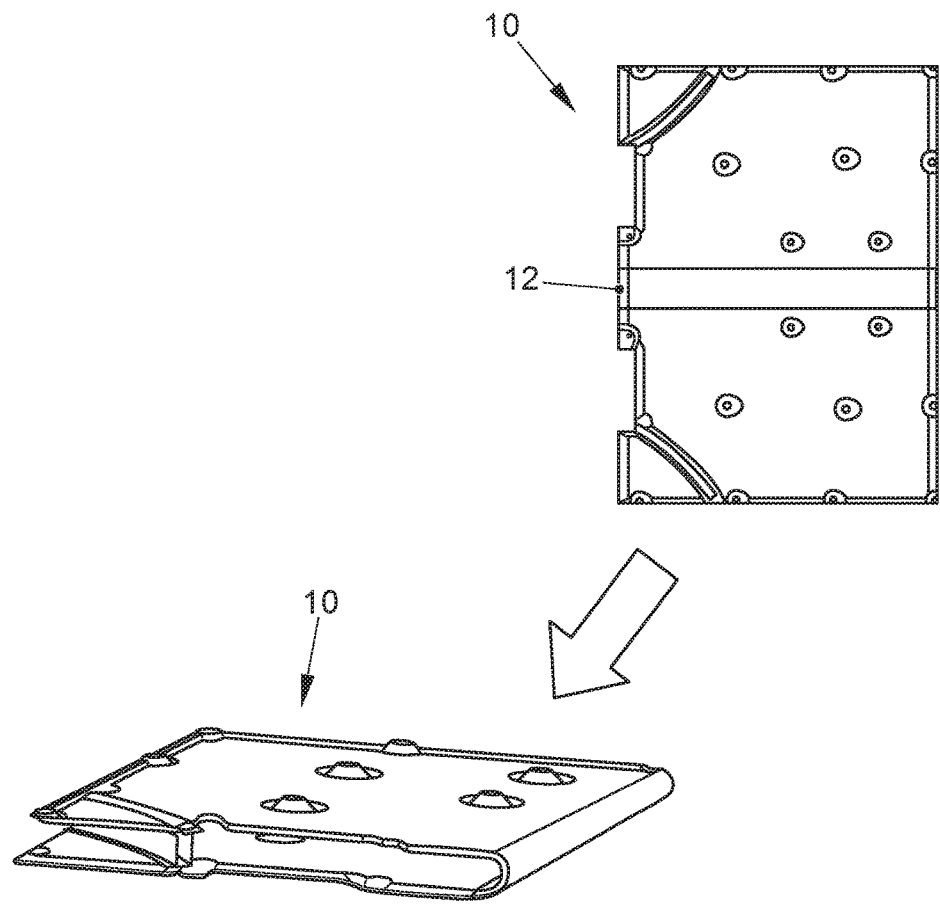
FIG. 1. is a perspective view of a first embodiment of an underbody.

FIG. 1 illustrates an underbody panel 10 composed of a lightweight sandwich material for a motor vehicle. The underbody panel 10 is a single integral part and has a continuous folding connection 12 extending in the transverse direction of the underbody panel 10. The material for the underbody panel 10 is SymaLite from Quadrant.

The underbody panel 10 has a size of 1380 mm×1300 mm. A single-part underbody panel 10 with such dimensions normally would require large load carriers and would project beyond the space in customary PAG high racks. Furthermore, special spaces next to the production line are frequently impossible because of the space conditions there. For this reason, the underbody panel 10 has the folding connection 12 between a first portion and a second portion. The folding connection 10 is substantially in the center of the underbody panel 10.

As shown in FIG. 1, the first portion and the second portion can be folded together via the folding connection 12 and, in the folded state of the underbody panel 10, are substantially parallel to each other. As a result, the size of the underbody panel 10 can be reduced for transport and storage. The transfer of the underbody panel 10 into a folded state is illustrated in FIG. 1 with the aid of the arrow.

Figure 2:
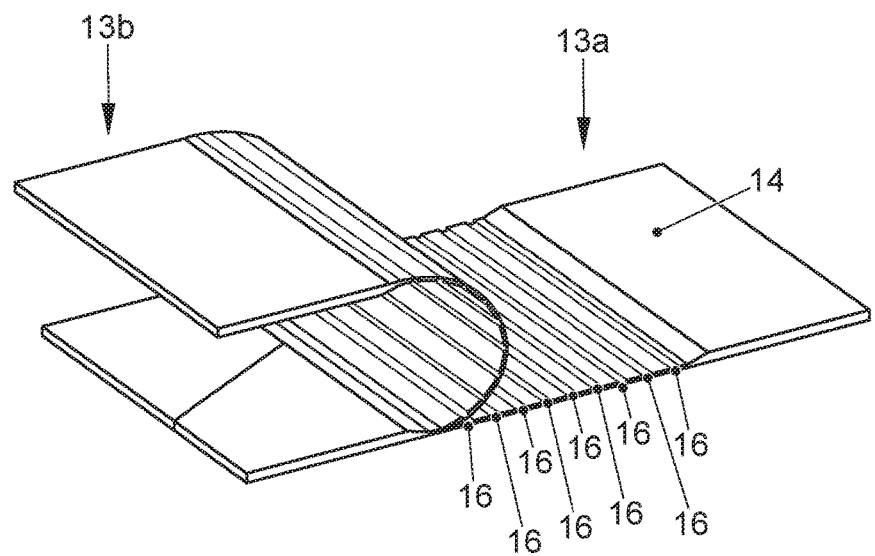
FIG. 2 is a perspective view of a second embodiment of an underbody.

FIG. 2 shows a second embodiment of underbody panel 13a, 13b in an installed state and a transport state, with the different states combined in one drawing. The underbody panel 13a illustrates the installed state and the underbody panel 13b illustrates the transport state. The folding connection between a first portion and a second portion 14 of the underbody panel 13a, 13b comprises plural bending lines 16. Radius transitions are arranged between the bending lines and the first and second portions 14 to reduce load peaks and to optimize the force flux. The first portion and the second portion have a lofted region with a greater wall thickness than the bending lines 16 of the folding connection.

Figure 3:
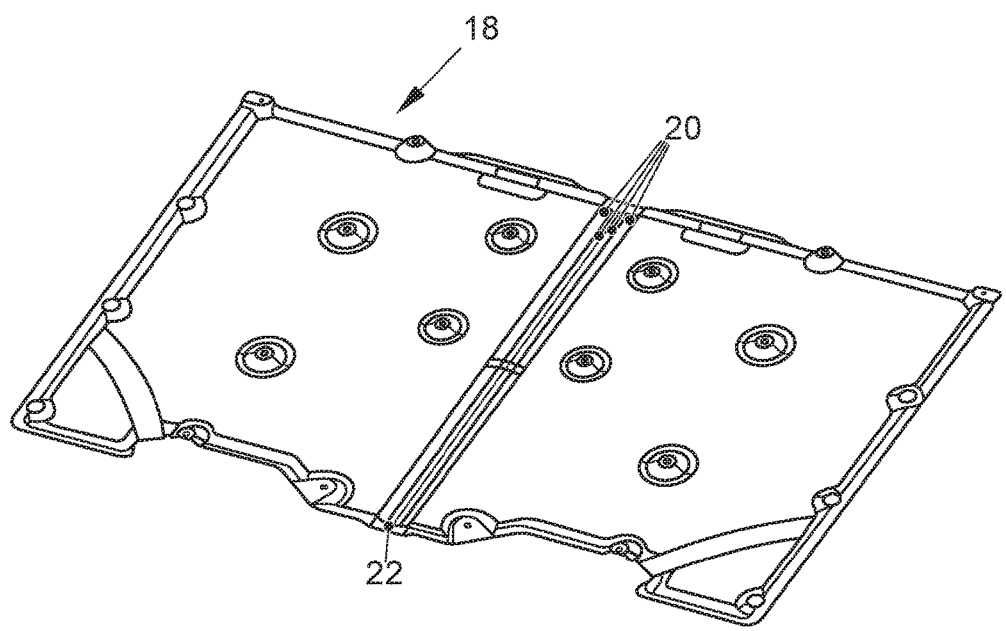
FIG. 3 is a perspective view of a third embodiment of an underbody.
Figure 4:
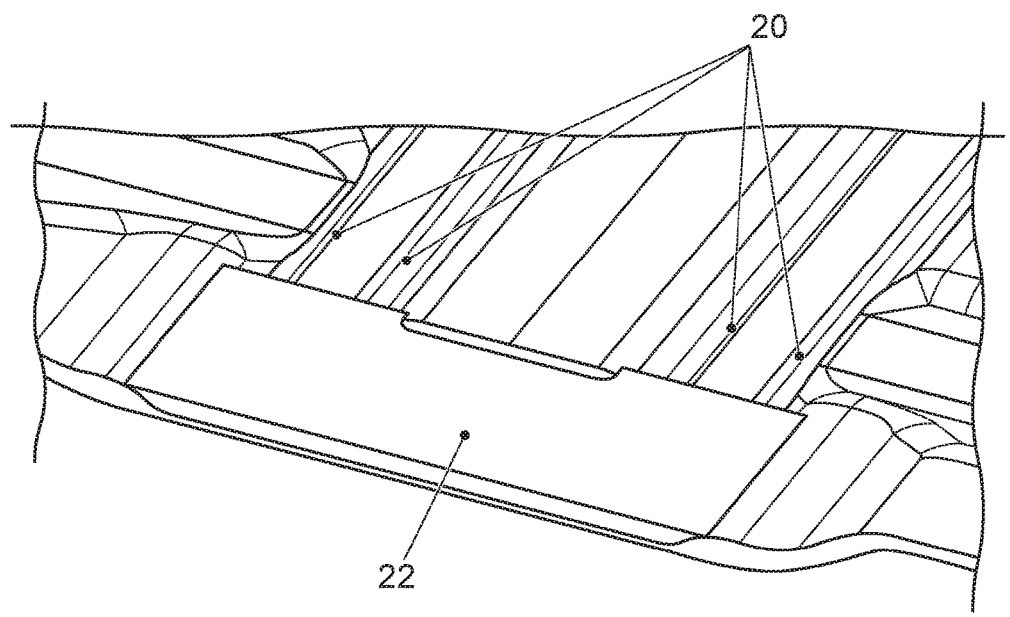
FIG. 4 is a perspective view of a portion of the folding connection of the underbody of FIG. 3.
Figure 5:
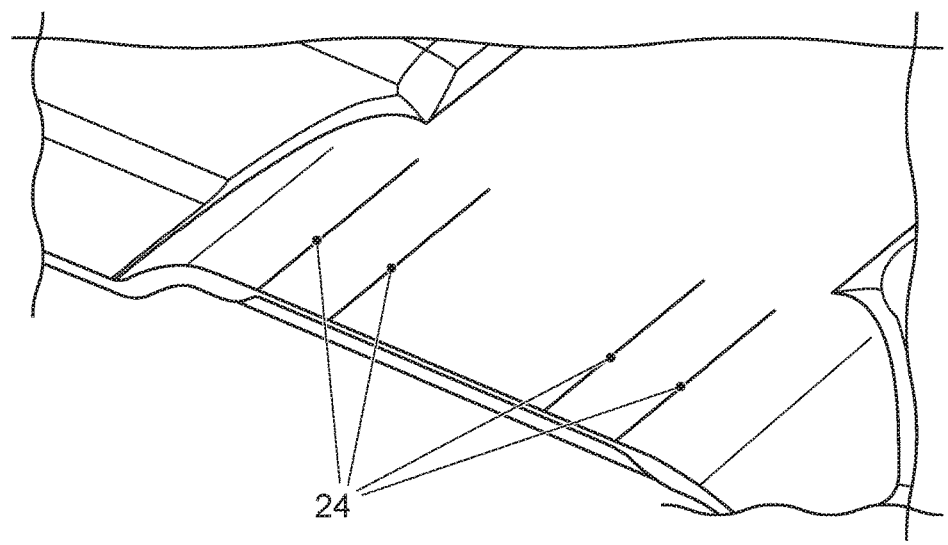
FIG. 5 is a perspective view taken from the opposite side of the view of FIG. 4.

FIGS. 3-5 illustrate an underbody panel 18 with four bending lines 20. Each bending line 20 is wedge-shaped and can be folded over by 45°. The bending lines 20 and the first and second portions each have radius transitions with respect to one another to reduce load peaks and to optimize the force flux. A total of three soft components 22 are arranged on the bending lines 20 at the borders of the underbody panel 18 and in the center to avoid or to stop cracks. The soft components 22 are made from thermoplastic elastomers (TPE). The soft components 22 are incorporated as a film during production of the underbody panel 18, and the underbody panel 18 is produced in a one-shot manufacturing process. FIG. 4 is a detailed view of the folding connection of the underbody panel 18 of FIG. 3 and shows the soft component 22 covering the bending lines 20 at the border of the folding connection. FIG. 5 illustrates the surface of the underbody panel 18 opposite the surface in FIG. 3 and shows that the underbody panel 18 has slots 24 in the regions of the soft components 22. The slots 24 are manufactured with a laser cut.

Figure 6:
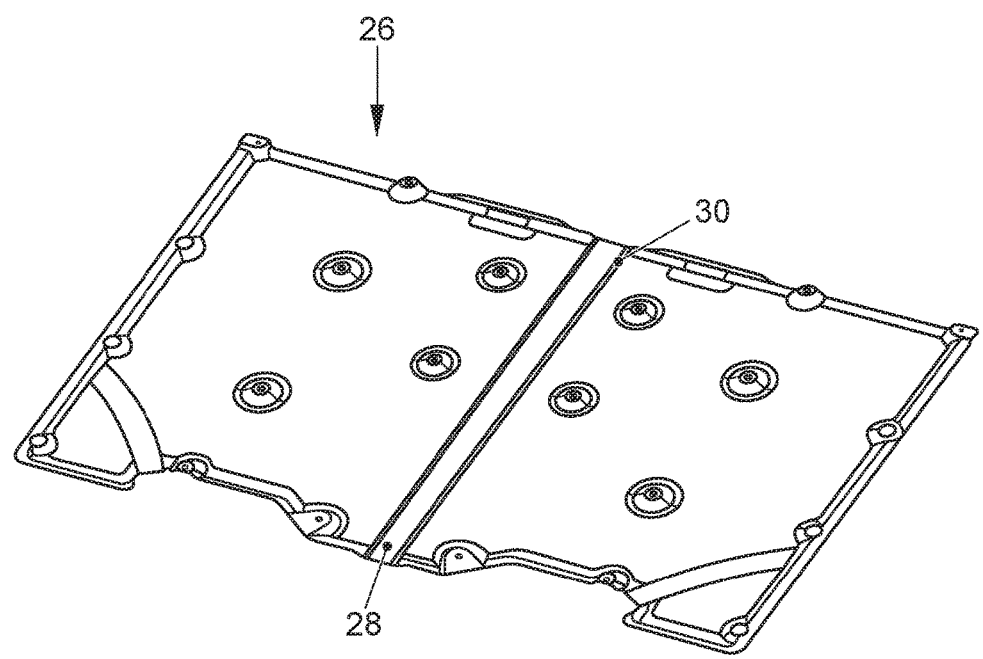
FIG. 6 is a perspective view of a fourth embodiment of an underbody.
Figure 7:
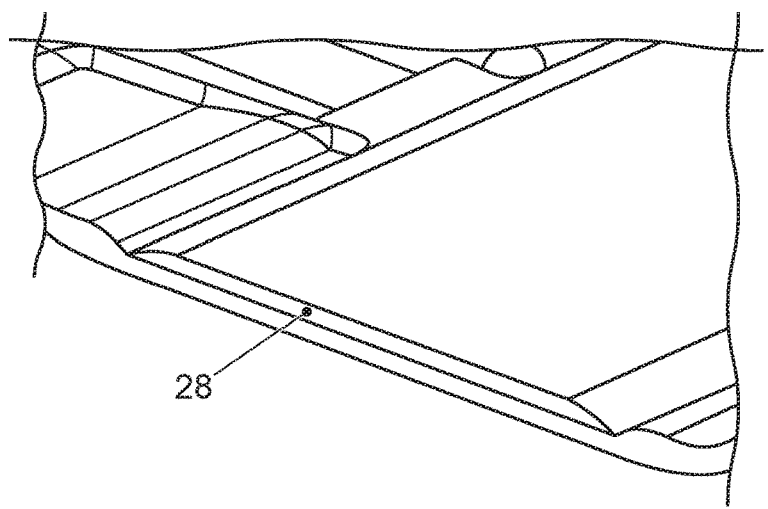
FIG. 7 is a perspective view of a portion of the folding connection of the underbody of FIG. 6.
Figure 8:
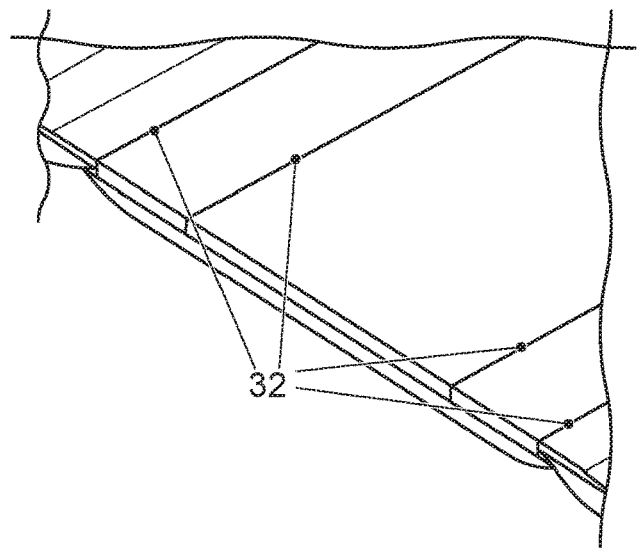
FIG. 8 is a perspective view taken from the opposite side of the view of FIG. 7.

FIGS. 6-8 show an embodiment of an underbody panel 26 where the folding connection 28 is covered completely with a soft component 30. The bending lines are arranged on borders of the soft component 30 that run in the transverse direction of the underbody panel 26. Each bending edge on the soft component 30 permits folding over by 45°. The soft component 30 is composed of a TPE material and has been pressed onto the underbody panel 26 in a one-shot manufacturing process. FIG. 7 is a detailed view of the folding connection 28 of the underbody panel 26 of FIG. 6 and shows that the entire folding connection 28 on one surface is covered by the soft component 30. FIG. 8 is a detailed view of the surface of the underbody panel 26 opposite the surface shown in FIG. 7 that is opposite the folding connection 28 and shows slots 32 formed in folded connection 28 over the entire width of the underbody panel 26 by laser trimming.

Figure 9:
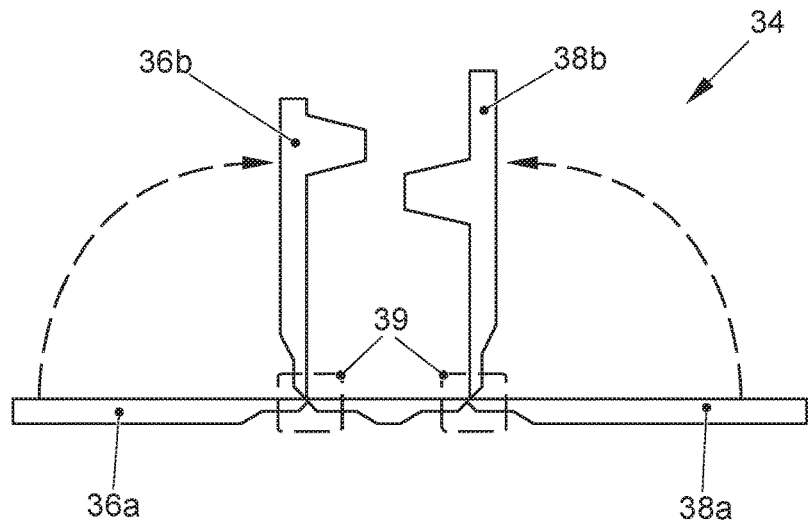
FIG. 9 is a schematic view of a folding operation of a fifth embodiment of the underbody.

FIG. 9 illustrates a side view of a folding-over operation of an underbody panel 34. The first portion is transferred out of the position 36a up by 90° at the folding connection 39 into the position 36b. At the same time or afterwards, the second portion is transferred out of the position 38a up by 90° at the folding connection 39 into the position 38b. The transfer of the first portion from the position 36a into position 36b and of the second portion from the position 38a into the position 38b is illustrated with the aid of the dashed arrows. The folding connection 39 has two bending lines that are emphasized by a dashed box. The underbody panel 34 is folded together at the bending lines. At the bending edges of the folding connection 39, the underbody panel 34 is pressed over to a minimum wall thickness. In the folded-together state, the first and second portions portions are oriented substantially parallel to each other. Furthermore, fastening elements, line elements, ducts, components, LLE or the like may be arranged on the mutually facing surfaces of the first and second portions of the folded underbody panel 34 and are protected from damage, for example distortion.

Figure 10:
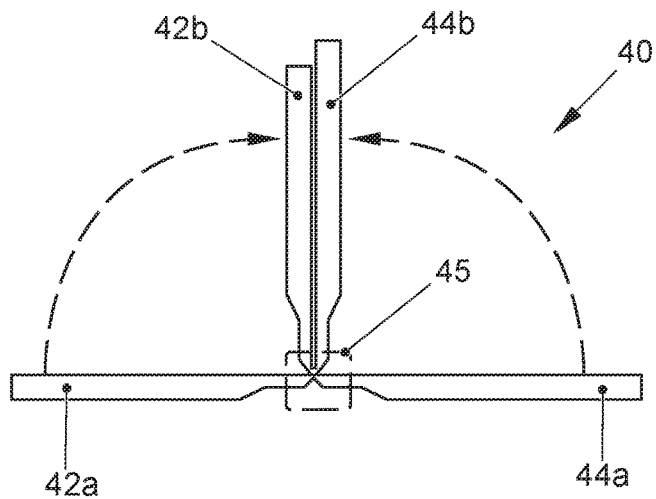
FIG. 10 is a schematic view of a folding operation of sixth embodiment of the underbody.

FIG. 10 is a side view of a further embodiment of an underbody panel 40 that is folded together for transport and storage. The first portion is transferred here out of the position 42a by 90° at the folding connection 45 into the position 42b, and the second portion is transferred out of the position 44a at the folding connection 45 into the position 44b. The folding operation at the folding connection is illustrated with the aid of the dashed arrows. The folding connection 45 is emphasized with a dashed box.

Figure 11:
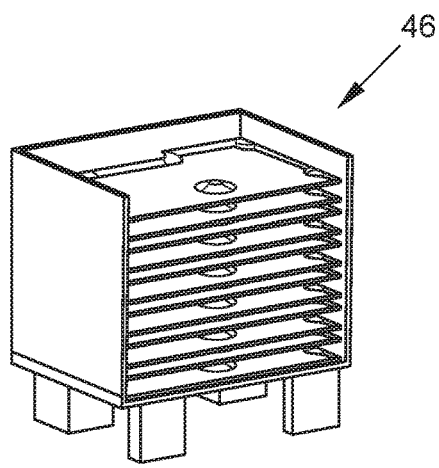
FIG. 11 is a perspective view of a filled load carrier with folded underbody panels.

FIG. 11 illustrates a load carrier 46 for storing underbody panels. The underbody panel is folded from a size of, for example, 1380 mm×1000 mm to 1000 mm×690 mm×110 mm. Thus, for example, up to 6 underbody panels may be stacked in a load carrier 46. The load carrier with dimensions of 700 mm×700 mm×1100 mm, which correspond to a customary storage space in a PAG high rack.

What is claimed is:

1. An underbody panel for a motor vehicle, the underbody panel being formed from a lightweight sandwich material and being configured as a single part, the underbody panel having at least one continuous folding connection extending in a transverse direction of the underbody panel being arranged between a first portion of the underbody panel and a second portion of the underbody panel, wherein the first portion and the second portion can be folded together via the folding connection and, in the folded-together state, are oriented substantially parallel to each other to reduce a size of the underbody panel during transport and storage of the underbody panel.

2. The underbody panel of claim 1, wherein the folding connection is arranged substantially in a center of the underbody panel.

3. The underbody panel of claim 1, wherein the folding connection comprises at least two bending lines.

4. The underbody panel of claim 3, wherein each of the bending lines is wedge-shaped and can be folded over by 90°.

5. The underbody panel of claim 3, wherein the at least two bending edges each have a radius transition at a transition from a bending line to an adjacent surface of the underbody panel.

6. The underbody panel of claim 1, further comprising at least one soft component at least partially covering the folding connection.

7. The underbody panel of claim 6, wherein the at least one soft component is applied in a one-shot manufacturing process.

8. The underbody panel of claim 6, wherein the underbody panel has opposite first and second surfaces, the soft component being on the first surface of the underbody panel and the second surface having at least one slot running parallel to the at least one folding connection.

9. The underbody panel of claim 8, wherein the at least one slot is produced by a laser cut.

10. A method for producing a folding connection in the underbody panel of claim 1, comprising:
providing the underbody panel,
pressing the underbody panel over at the folding connection to a minimum wall thickness.

* * * * *